United States Patent Office 3,205,227
Patented Sept. 7, 1965

3,205,227
6β:19-OXIDO-TESTOSTERONE AND INTERMEDIATES USED IN THE PREPARATION THEREOF
Albert Wettstein, Riehen, Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,200
Claims priority, application Switzerland, July 15, 1960, 8,133/60; Oct. 28, 1960, 12,107/60; Dec. 23, 1960, 14,393/60; Apr. 5, 1961, 3,989/61; June 2, 1961, 6,479/61; June 13, 1961, 6,895/61
9 Claims. (Cl. 260—239.55)

This application is a continuation-in-part of our co-pending application Ser. No. 122,657, filed July 10, 1961, now abandoned, by Albert Wettstein et al.

The present invention relates to novel Δ⁴-3-oxo-6β:19-oxido-androstenes, more especially to compounds of the formula

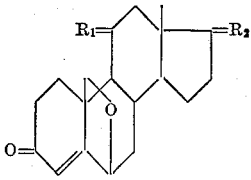

wherein $R_1$ stands for hydrogen, oxo, hydroxy or acyloxy and hydrogen, and $R_2$ stands for oxo, β-hydroxy or β-acyloxy together with hydrogen, lower alkyl, lower alkenyl or lower alkinyl.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoroacetic, carbonic-monomethyl- or ethylester, hexahydrobenzoic, cyclopentyl-propionic, phenylpropionic, benzoic or furoic acid. The lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoro-methyl-ethinyl.

The compounds of the present invention are extremely important intermediates for the production of 19-nor-androstanes to which class of compounds belong several well known androgenic, anabolic and gestagenic agents as well as ovulation inhibitors such as 19-nor-testosterone and its esters, -17α-methyl-19-nor-testosterone, 17α-ethinyl-19-nor-testosterone, Δ⁵⁽¹⁰⁾-3-oxo-17β-hydroxy-17α-ethinyl-19-nor-testosterone.

The 19-nor-androstanes are produced from the Δ⁴-3-oxo-6β:19-oxido-androstenes of the present invention by reduction with zinc in acetic acid at slightly elevated temperature and elimination of the argular C-19-substituent in the Δ⁴-3-oxo-19-hydroxy-androstenes formed in known manner, preferably after oxidizing the 19-hydroxy group to an aldehyde or acid function.

Among the Δ⁴-3-oxo-6β:19-oxido-androstenes of the invention the following are particularly important:

Δ⁴-3:17-dioxo-6β:19-oxido-androstene, Δ⁴-3-oxo-6β:19-oxido-17β-hydroxy-androstene (6β:19-oxido-testosterone) and its esters, Δ⁴-3-oxo-6β:19-oxido-17β-hydroxy-17α-R-androstenes wherein R stands for methyl, ethyl, butyl, isobutyl, vinyl, alkyl, ethinyl or 2-methyl-ethinyl.

The androstenes of the invention are obtained e.g. by treating a 3-oxygenated 5α-halogen-6β-hydroxy-androstane with lead tetraacetate in boiling benzene or cyclohexane for several hours to form the corresponding 3-oxygenated 5α-halogen-6β:19-oxido-steroid. The latter compounds may also be obtained by reacting a 3-oxygenated 5α-halogen-6β-hydroxy-androstane in boiling cyclohexane solution with monovalent positive iodine in the presence of free iodine and strong visible light for 10 to 90 minutes. The monovalent positive iodine may be obtained from N-iodo-succinimide or from silver acetate and iodine or mercuric acetate and iodine. An especially efficient method for the production of the 5α-halogen-6β:19-oxido-androstanes consists in treating a 5α-halogen-6β-hydroxy-androstane in an apolar solvent e.g. in boiling cyclohexane solution with lead tetraacetate and iodine. The 3-oxygenated 5α - halogen - 6β:19 - oxido-androstane obtained are then transformed into the Δ⁴-3-oxo-androstanes of the invention (if desired after modification of other functional group e.g. a ketone-17-position by reduction or alkylation, alkinylation etc.) e.g. by alkaline hydrolysis of a 3-acyloxy-group present and oxidation of the 3-hydroxy group to a 3-oxo group by means of chromium trioxide. Under the influence of a base such as pyridine or sodium acetate hydrohalic acid is early eliminated from the 3-oxo-5α-halogen-6β: 19-oxido-androstanes to form the Δ⁴-3-oxo-6β:19-oxido-androstenes.

The following examples illustrate the invention. The temperatures are given in centigrade.

Example 1

(a) A suspension of 22.0 grams of calcium carbonate and 66.0 grams of dried lead tetraacetate in 3.3 liters of cyclohexane is heated to 80° C., 17.6 grams of iodine are added, and the mixture is refluxed and stirred for 20 minutes in the dark. The slightly cooled reaction solution is treated with 11.0 grams of 3β-acetoxy-5α-chloro-6β-hydroxy-17-oxo-androstane and then refluxed with stirring for 2 hours in daylight. The cooled reaction mixture is filtered, the residue exhaustively washed with absolute ether and the filtrate is washed with sodium thiosulfate solution of 10% strength and with water. Evaporation of the dried solution under vacuum yields 12.1 grams of a crystalline product which, after recrystallization from ether+methanol, yields 7.65 grams of 3β-acetoxy-5α-chloro-6β:19-oxido-17-oxo-androstane melting at 180 to 182° C. The infra-red absorption spectrum of the pure compound contains bands, inter alia, at 5.76, 6.73, 7.35, 8.10, 9.65, 10.60, 10.82, 11.35, 11.67 and 12.50µ.

A solution of 2.0 grams of 3β-acetoxy-5α-chloro-6β:19-oxido-17-oxo-androstane in 200 cc. of methanol is mixed with a solution of 2.0 grams of potassium carbonate in 10 cc. of water and the whole is refluxed for one hour. The reaction mixture is treated with water and freed from methanol under vacuum, taken up in ether, washed three times with water, dried with sodium sulfate and evaporated. Yield: 1.620 grams of 3β-hydroxy-5α-chloro-6β:19-oxido-17-oxo-androstane melting at 223–226° C. After having been recrystallized from methylene chloride+methanol the pure compound melts at 227 to 229° C. and displays in the infra-red spectrum absorption bands, inter alia, at 2.80, 3.28, 5.78, 6.75, 9.55, 9.78, 10.05, 10.63, 10.87, 11.33, 11.70 and 12.55µ.

(b) An oxidation mixture of 3.00 grams of chromium trioxide and 60 cc. of pyridine is treated with 1.500 grams of 3β-hydroxy-5α-chloro-6β:19-oxido-17-oxo-androstane. After 24 hours at 45 to 50° C. the reaction mixture is cooled, treated with 50 grams of ice and 50 cc. of sodium hydrosulfite solution of 40% strength, extracted with ether and worked up under usual conditions. The resulting crude product is recrystallized once from methylene chloride+methanol and yields 825 mg. of Δ⁴-3:17-dioxo-6β:19-oxido-androstene melting at 184 to 186° C. The infra-red absorption spectrum of the product contains bands, inter alia, at 5.80, 6.01, 6.82, 6.95, 7.35, 7.65, 8.40, 8.81, 9.23, 9.80, 9.92, 10.40, 10.63, 11.40 and 12.30μ.

(c) 7.5 grams of 3β-acetoxy-6β:19-oxido-5α-chloro-17-oxo-androstane in 100 cc. of toluene are treated with a Grignard reagent prepared from 8 cc. of methyl iodide in 120 cc. of ether with the aid of excess magnesium. When heat is no longer being evolved, the mixture is heated while distilling off the solvent until the temperature of the remaining reaction mixture has risen to 90° C. The whole is then diluted with benzene and the reaction products are dissolved by adding aqueous ammonium chloride solution and dilute hydrochloric acid. The organic phase is washed with sodium thiosulfate solution, dried and evaporated, to yield 7 grams of crude 3β:17β-dihydroxy-5α-chloro-6β:19-oxido-17α-methyl - androstane which crystallizes on addition of a small amount of methylene chloride and is obtained from isopropanol in crystals which melt at 212 to 214° C. and contain 1 molecular equivalent of isopropanol of crystallization.

9 grams of this product are dissolved in acetone and treated with excess aqueous chromic acid in the presence of a small amount of sulfuric acid for 10 minutes at 10 to 15° C., diluted with much water, the crude 3-oxo-5α - chloro - 6β:19 - oxido - 17α - methyl - 17β - hydroxy-androstane is suctioned off and the moist filter residue is boiled in 1 liter of methanol with 25 grams of potassium acetate while distilling off methanol, the residue is taken up in benzene, the benzene solution is washed with water, dried and evaporated. There are obtained 6.9 grams of 6β:19-oxido-17α-methyl-testosterone which, after recrystallization from benzene, melts at 157 to 158° C.

When 3β-acetoxy-6β:19-oxido-5α-chloro-17-oxo-androstane is reacted in a similar manner with ethyl magnesium bromide, there is obtained 3β:17β-dihydroxy-5α-chloro-6β:19-oxido-17α-ethyl-androstane which, by oxidation and treatment with potassium acetate as described above, yields 6β:19-oxido-17α-ethyl-testosterone.

When in the above example methyl magnesium iodide is replaced by allyl magnesium bromide, there is obtained 3β:17β - dihydroxy - 5α - chloro - 6β:19 - oxido - 17α-allyl-androstane which, in the form of the crude crystallizate, melts at 205 to 207° C. and displays in the infrared absorption spectrum bands, inter alia, at 2.75, 6.12, 6.75, 6.9, 7.6, 9.5, 9.76, 10.0 and 10.85μ. When it is treated as described above with chromic acid, it yields 3 - oxo - 17β - hydroxy - 5α - chloro - 6β:19 - oxido - 17α-allyl-androstane (characteristic bands in the infra-red spectrum at 5.8, 6.1, 6.7, 7.5, 8.1, 9.1 and 9.7μ) which, on treatment with methanolic potassium acetate as described above, yields Δ⁴-3-oxo - 6β:19 - oxido - 17α - allyl-17β-hydroxy-androstene melting at 90° C. Characteristic bands in the infra-red spectrum at 6.0, 6.1, 6.8, 7.26, 8.35, 8.75, 9.74, 10.63 and 11.36μ.

In an identical manner to that shown in parent application Serial No. 122,657, page 3, lines 6–15, and page 19, lines 1–15, there is prepared From Δ⁵-3β:17β-diacetoxy-androstene the 3β:17β-diacetoxy-5α-chloro-6β-hydroxy-androstane melting at 197–199°, From Δ⁵-3β-acetoxy-17β-hydroxy-17α-methyl-androstene the 3β-acetoxy-5α-chloro-6β:17β-dihydroxy-17α-methyl-androstane melting at 179–181°, and From Δ⁵-3β:17β-diacetoxy - 17α - methyl-androstane the 3β:17β - diacetoxy - 5α - chloro - 6β - hydroxy - 17β-methyl-androstane.

Example 2

A suspension of 16 grams of lithium aluminum hydride in 1.5 liters of tetrahydrofuran is treated in the course of 10 minutes with stirring with a solution of 40 grams of Δ⁴-3:17-dioxo-6β:19-oxido-androstene in 800 cc. of tetrahydrofuran. The mixture is then refluxed at the boil for 1½ hours, cooled to 10° C. and at 10 to 20° C. a mixture of 500 cc. of ethyl acetate and 1.5 liters of ether is run in. The mixture is then treated at 10 to 20° C. with a solution of 300 grams of anhydrous sodium sulfate in 900 cc. of water, the organic solution is decanted and the remaining sludge is twice stirred with methylene chloride. The methylene chloride extracts are washed with 500 cc. of 2 N-hydrochloric acid and combined with the tetrahydrofuran solution. The solution is dried, filtered, and then evaporated under reduced pressure at first at 60° C. and then at 40° C. bath temperature. There are obtained 40 grams of crystalline Δ⁴-3:17β-dihydroxy-6β:19-oxido-androstene which, after having been recrystallized from chloroform, melts at 227 to 229° C. The resulting crude reaction product (40 grams) is dissolved in a mixture of 300 cc. of acetone and 1.2 liters of benzene, treated with 80 grams of aluminum isopropylate and the whole is stirred for 17 hours under nitrogen at 30 to 31° C. The reaction mixture is cooled and 140 cc. of Seignette salt solution of 50% strength are rapidly added dropwise. The clear organic layer is decanted and the thickly liquid aqueous phase is stirred with 1 liter of benzene. The combined organic solutions are dried with sodium sulfate and evaporated under vacuum. The residue is dissolved in ether, filtered through a column of alumina (height 7 cm. diameter 4 cm.) and once more evaporated. The crude product (about 40 grams) yields on recrystallization from 60 cc. of acetone a first fraction of 24 grams of pure Δ⁴-3-oxo-6β:19-oxido-17β-hydroxy-androstene (6β:19-oxido-testosterone) in the form of crystals containing acetone melting at 78 to 80° C. After being treated in a high vacuum for a longer time the compound melts at 127–130° C.

(f) A solution of 12.2 grams of 6β:19-oxido-testosterone in 36 cc. of pyridine is treated at 10 to 15° C. while being stirred within 2 minutes with 8 cc. of caprylchloride. The reaction mixture is allowed to heat up within 30 minutes slowly to 20° C. while being stirred, ice and water are added, and the whole is extracted after 2 hours with benzene. The extracts are washed with 2 N-hydrochloric acid and ice-cold sodium bicarbonate solution of 5% strength, dried and evaporated in a water-jet vacuum, to yield 17.5 grams of Δ⁴-3-oxo-6β:19-oxido-17β-decanoyloxy-androstene (6β:19-oxido-testosterone caprinate) as a pale oil.

When 6β:19-oxido-testosterone is esterified in an analogous manner with β-phenylpropionyl chloride, Δ⁴-3-oxo-6β:19-oxido - 17β - (β - phenylpropionyloxy)-androstene is obtained as an almost colorless oil.

2.0 grams of 6β:19-oxido-testosterone are dissolved in a mixture of 10 cc. of pyridine and 10 cc. of acetic anhydride, heated for 3 hours at 60° C. and then evaporated in a water-jet vacuum. Crystallization of the residue from ether yields 1.82 grams of Δ⁴-3-oxo-6β:19-oxido-17β-acetoxy-androstene melting at 149 to 152° C. Optical rotation $[\alpha]_D = -96°$ (in chloroform). Ultra-violet maximum at 238 mμ ($\epsilon = 13200$). Bands in the infra-red spectrum, inter alia, at 5.76, 5.96, 6.73, 7.27, 8.09, 9.10, 9.17, 9.26 and 11.42μ.

(g) A solution of 940 mg. of Δ⁴-3:17-dioxo-6β:19-oxido-androstene in 50 cc. of methanol is cooled to —20° C. and treated with a solution of 100 mg. of sodium borohydride in 2.5 cc. of 2 N-sodium hydroxide solution. The mixture is kept for 2 hours at —20° C., treated with 10 cc. of 2 N-sulfuric acid and 30 cc. of water, and the methanol is distilled off in a water-jet vacuum. The product which separates out is taken up in methylene chloride, and the organic solution is washed with water, dried and evaporated. The crystalline residue is stirred for one hour with 100 cc. of benzene and the insoluble Δ⁴-3:17β-dihydroxy-6β:19-oxido-androstene (360 mg.) is then filtered off. Recrystallization from methylene chloride+methanol yields the pure compound which melts at 221 to 222° C. Optical rotation $[\alpha]_D = +48.6°$ (in chloroform+alcohol 1:1). The benzene filtrate is evaporated to dryness and the residue (598 mg.) is crystallized from acetone, to yield 346 mg. of pure Δ⁴-3-oxo-6β:19-oxido-17β-hydroxy-androstene melting at 78 to 80° C.

Example 3

A mixture of 59.4 grams of lead tetraacetate, 27 grams of calcium carbonate and 2430 cc. of cyclohexane is heated for 30 minutes at the boil, then treated with 13.45 grams of crude 3β-acetoxy-5α-bromo-6β-hydroxy-17-oxo-androstane and 17.5 grams of iodine, and then further boiled and stirred while being irradiated with a 500-watt lamp. After one hour the solution is colorless; it is cooled, filtered, the filter residue is rinsed with cyclohexane and the filtrate is agitated with dilute sodium thiosulfate solution. The organic solution is then dried and evaporated in a water-jet vacuum. The oily residue (22.75 grams) is dissolved in a 1:4-mixture of benzene and hexane and filtered through 200 grams of alumina. At first a high-boiling oil is eluted, then 1:4- and 1:1-mixtures of benzene and hexane elute about 7.0 grams of substance. Crystallization of this fraction residue from methylene chloride+ether yields 5.5 grams of pure 3β-acetoxy-5α-bromo-6β:19-oxido-17-oxo-androstane of double melting point 174–178/184–187° C. Optical rotation $[\alpha]_D = +44.6°$ (in chloroform). The infra-red spectrum of the compound contains bands, inter alia, at 5.76, 6.68, 7.30, 8.09, 9.16 and 10.92μ.

From the following fraction eluted with benzene and with mixtures of benzene and ethyl acetate there is isolated by crystallization from methanol or from methylene chloride+ether a compound of the formula $C_{21}H_{30}O_4$ melting at 219 to 221° C. Optical rotation $[\alpha]_D = -8.7°$ (in chloroform). The infra-red spectrum of the compound contains bands, inter alia, at 5.96, 7.26, 7.31, 8.10, 9.73 and 11.52μ.

A mixture of 5.07 grams of 3β-acetoxy-5α-bromo-6β:19-oxido-17-oxo-androstane in 500 cc. methanol with a solution of 5.0 grams of potassium carbonate in 50 cc. of water is heated for one hour on a bath maintained at 80° C., then evaporated in a water-jet vacuum until crystallization sets in, taken up in methylene chloride and the organic solution is washed with water, dried and evaporated, to yield 4.52 grams of crude crystalline 3β-hydroxy-5α-bromo-6β:19-oxido-17-oxo-androstane which melts at 214 to 218° C. after recrystallization from methylene chloride+ether (conversion above 188° C). Optical rotation $[\alpha]_D = +47.1°$ (in chloroform). The infra-red spectrum contains bands, inter alia, at 2.75, 5.75, 6.69, 9.52, 9.79, 10.06 and 11.05μ.

A solution of 700 mg. of 3β-hydroxy-5α-bromo-6β:19-oxido-17-oxo-androstane in 35 cc. of acetone is cooled to 0° C. and then treated with 1.0 cc. of a solution, diluted with water to 50.0 cc., of 13.3 grams of chromium trioxide in 11.5 cc. of concentrated sulfuric acid and the whole is stirred for 15 minutes at 0° C., then treated with a solution of 8.0 grams of crystalline sodium acetate in 15 cc. of water and diluted with benzene. The organic phase is separated and washed with water. The residue of the dried benzene solution yields on crystallization from methylene chloride+ether 570 mg. of the pure Δ⁴-3:17-dioxo-6β:19-oxido-androstene melting at 184 to 186° C. described in Example 1, part b).

Example 4

(a) A mixture of 150 cc. of cylohexane, 1.0 gram of calcium carbonate, 3.0 grams of lead tetraacetate and 980 mg. of iodine is heated for ½ hour with stirring at 80° C. in the dark. 500 mg. of 3β:17β-diacetoxy-5α-chloro-6β-hydroxy-androstane are added and the reaction mixture is refluxed further (1½ to 2½ hours) until it has lost its color. The cooled solution is filtered, the residue is washed with ether, and the filtrate is washed with sodium thiosulfate solution of 10% strength and water, dried and evaporated under reduced pressure. Yield: 620 mg. of amorphous 3β:17β-diacetoxy-5α-chloro-6β:19-oxido-androstane mixed with a small amount of a sparingly volatile oil of aromatic odor; the product is purified on alumina. After crystallization from alcohol the pure compound melts at 160 to 161° C. Its infra-red spectrum contains, in addition to the strong acetate absorptions at 5.76, 8.16 and 9.65μ, absorption bands at 6.72, 10.60, 10.75 and 12.51μ.

A solution of 870 mg. of crude 3β:17β-diacetoxy-5α-chloro-6β:19-oxido-androstane in 50 cc. of methanol is treated with 250 mg. of sodium hydroxide in 1 cc. of water; the mixture is kept for 3 days at 25° C., treated with water, and the methanol is evaporated under vacuum. The residue is taken up in ether+methylene chloride, washed with water until it is neutral and the product isolated in the usual manner, to yield 680 mg. of crystalline 3β:17β-dihydroxy-5α-chloro-6β:19-oxido-androstane. After one recrystallization the compound melts at 220 to 224° C. The infra-red absorption spectrum contains bands, inter alia, at 2.76, 6.75, 7.00, 7.30, 9.55, 9.76, 10.62, 10.90, 11.70 and 12.60μ.

(b) A solution of 80 mg. of 3β:17β-dihydroxy-5α-chloro-6β:19-oxido-androstane in 5 cc. of pyridine is treated with a mixture of 200 mg. of chromium trioxide and 5 cc. of pridine and heated with stirring for 20 hours at 45 to 50° C. The usual working up, followed by recrystallization from methylene chloride+methanol, yields 45 mg. of Δ⁴-3:17-dioxo-6β:19-oxido-androstene melting at 184 to 186° C., which is in every respect identical with the product described in Example 1, part b).

Example 5

A mixture of 22 grams of lead tetraacetate, 10 grams of calcium carbonate and 900 cc. of cyclohexane is heated with stirring for 30 minutes at the boil. 5.0 grams of 3β:17β-diacetoxy-5α-bromo-6β-hydroxy-androstane and 6.4 grams of iodine are then added and the whole is stirred for another hour at the boil while being irradiated with a 500-watt lamp, then cooled, the colorless solution is filtered and the filtrate is washed with water, dried and evaporated in a water-jet vauum. There are obtained 5.53 grams of a crude product which is dissolved in a 1:4-mixture of benzene and hexane and filtered through 100 grams of alumina. Elution with a 1:4-mixture and a 1:1-mixture of benzene and hexane and with plain benzene elutes 3.4 grams of substance which after crystallization from methylene chloride+ether+hexane yields 2.6 grams of pure 3β:17β-diacetoxy-5α-bromo-6β:19-oxido-androstane melting at 178 to 180° C. Optical rotation $[\alpha]_D = -5.4°$ C. (in chloroform). In the infra-red spectrum of the compound there are bands, inter alia, at 5.78, 6.69, 7.30, 8.10, 9.12, 9.63, 9.75 and 10.93μ.

A mixture of 2.236 grams of the latter compound, 225 cc. of methanol and a solution of 2.25 grams of potassium carbonate in 22.5 ml. of water is refluxed for one hour. The reaction mixture is then cooled and concentrated in a water-jet vacuum until crystallization sets in. The concentrate is taken up in a 3:1-mixture of methylene chloride and methanol and washed with water. The organic solution is dried and evaporated, to yield 1.83 grams of pure 3β:17β-dihydroxy-5α-bromo-6β:19-oxido-androstane melting at 235 to 236° C. Optical rotation $[\alpha]_D = -8.7°$ (in chloroform). Infra-red bands (in Nujol), inter alia, at 2.93, 6.70, 7.72, 8.61, 9.03, 9.38, 11.08, 11.76 and 12.69μ.

A solution of 500 mg. of crude 3β:17β-dihydroxy-5α-bromo-6β:19-oxido-androstane in 50 cc. of acetone is cooled to 0° C. and treated with 1.0 cc. of a solution, diluted with water to 50 cc. of 13.3 grams of chromium trioxide in 11.5 cc. of concentrated sulfuric acid. The mixture is stirred for 25 minutes at 0° C., treated with 8.0 grams of crystalline sodium acetate and 15 cc. of water, and diluted with benzene. The organic phase is washed with water and the benzene solution is dried and evaporated to dryness in a water-jet vacuum. The residue (409 mg.) is crystallized from methylene chloride+ether, to yield 339 mg. of pure Δ⁴-3:17-dioxo-6β:19-oxido-androstene melting at 184 to 186° C.

In a fully analogous manner as described above by treatment 3β:11α:17β-triacetoxy-5α-chloro-6β-hydroxy-androstane with lead tetraacetate and iodine the 3β:11α:17β-triacetoxy-5α-chloro-6β:19-oxido-androstane is formed which after hydrolysis of the acetoxy groups with potassium carbonate followed by oxidation with chromium trioxide in acetone with addition of sulfuric acid and subsequent treatment with sodium acetate affords the Δ⁴-3:11:17-trioxo-6β:19-oxido-androstene.

What is claimed is:
1. Δ⁴-3-oxo-6β:19-oxido-androstenes of the formula

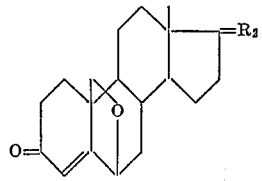

wherein $R_2$ stands for a member selected from the group consisting of oxo, β-hydroxy together with hydrogen, β-acyloxy together with hydrogen, β-hydroxy together with lower alkyl, β-hydroxy and lower alkenyl and β-hydroxy and lower alkinyl, said acyloxy being derived from a carboxylic acid having at most fifteen carbon atoms.

2. Δ⁴-3:17-dioxo-6β:19-oxido-androstene.
3. Δ⁴-3-oxo-6β:19-oxido-17α-methyl-17β-hydroxy-androstene.
4. Δ⁴-3-oxo-6β:19-oxido-17α-ethyl-17β-hydroxy-androstene.
5. Δ⁴-3-oxo-6β:19-oxido-17α-allyl-17β-hydroxy-androstene.
6. Δ⁴-3-oxo-6β:19-oxido-17β-hydroxy-androstene.
7. Δ⁴-3-oxo-6β:19-oxido-17β-decanoyloxy-androstene.
8. Δ⁴-3-oxo-6β:19-oxido-17β-(β-phenylpropionyloxy)-androstene.
9. Δ⁴-3-oxo-6β:19-oxido-17β-acetoxy-androstene.

References Cited by the Examiner
UNITED STATES PATENTS

| | | | |
|---|---|---|---|
| 2,837,464 | 6/58 | Nobile | 195—51 |
| 3,001,989 | 9/61 | Ringold et al. | 260—239.55 |

LEWIS GOTTS, *Primary Examiner.*